April 8, 1969

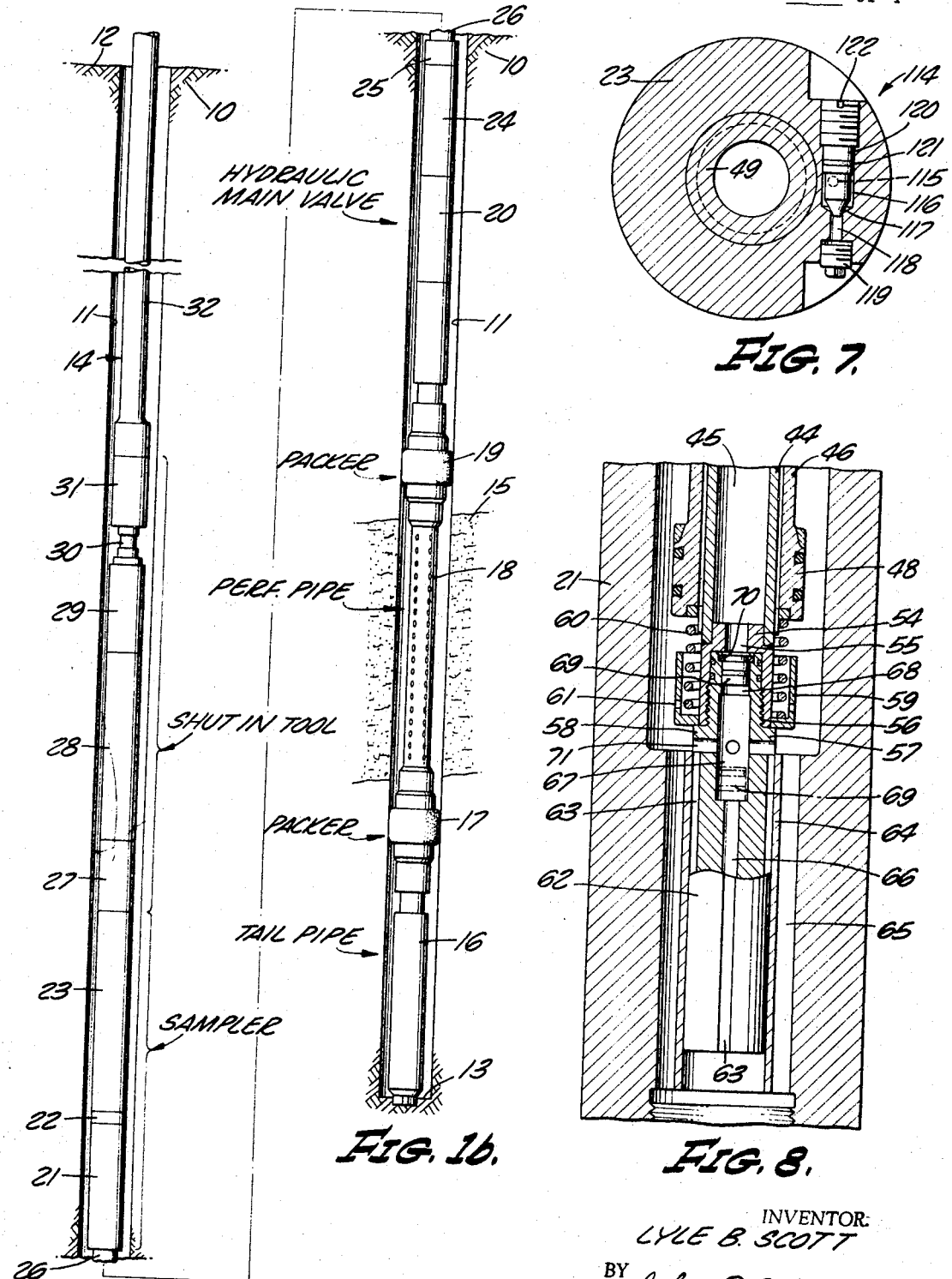

L. B. SCOTT 3,437,138

DRILL STEM FLUID SAMPLER

Filed Jan. 24, 1966

INVENTOR.
LYLE B. SCOTT

BY John O. Evans, Jr.

ATTORNEY

INVENTOR.
LYLE B. SCOTT
BY John O. Evans, Jr.
ATTORNEY

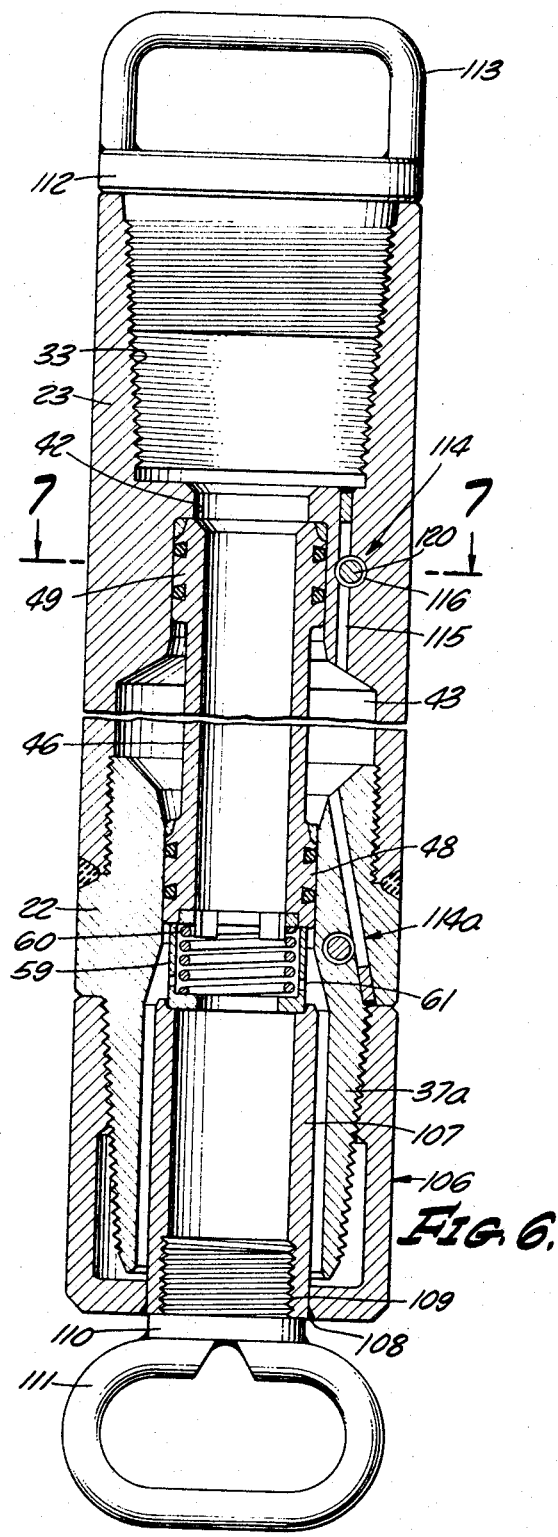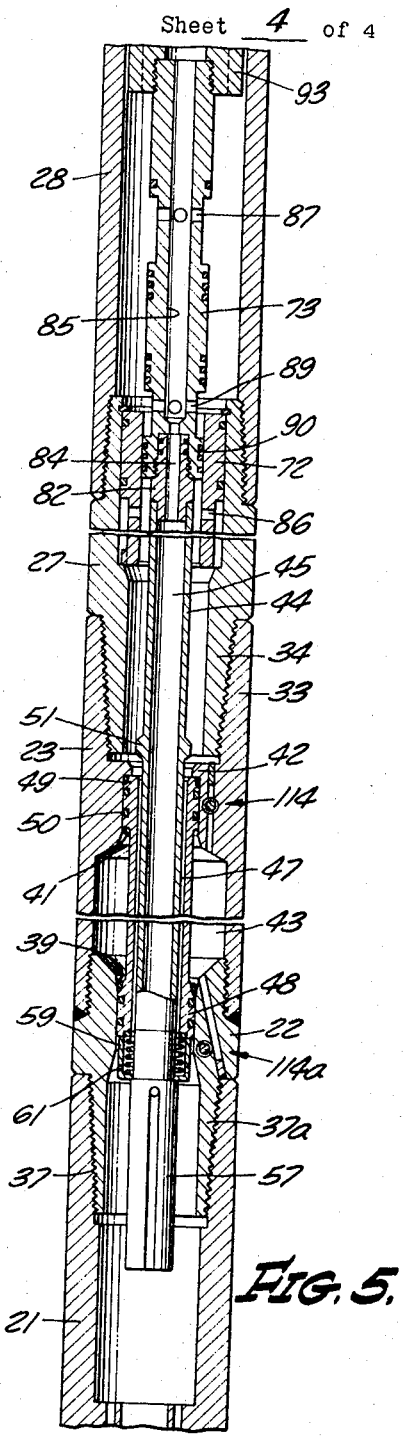

United States Patent Office 3,437,138
Patented Apr. 8, 1969

3,437,138
DRILL STEM FLUID SAMPLER
Lyle B. Scott, South Gate, Calif., assignor to Byron Jackson Inc., Long Beach, Calif., a corporation of Delaware
Filed Jan. 24, 1966, Ser. No. 522,650
Int. Cl. E21b 27/00, 33/132, 33/13
U.S. Cl. 166—162
6 Claims

ABSTRACT OF THE DISCLOSURE

Apparatus for taking a sample of fluid from a string of well pipe, the apparatus having a housing, including a fluid sample chamber, the housing forming a section of the string of well pipe, valve seats at each end of the housing, and a reciprocable valve assembly having valve members cooperating with the valve seats and operable to open the chamber to admit a fluid sample and to close the chamber to retain the sample, the apparatus further having bypass means for the flow of fluid around the sample chamber. The apparatus is readily converted to a form suitable for transportation to a testing laboratory without loss of the fluid sample.

---

This invention relates to a drill stem fluid sampler.

In the drilling of wells, such as oil, gas and water wells, it is common practice to make drill stem tests to evaluate earth formations into which the well bore extends or through which it passes. Such evaluations may include the determination of the rate of flow of fluid from the formation, the temperature and pressure of the fluid under flowing or static conditions in the well, and the chemical analysis and physical characteristics of the formation fluid. A sample of the formation fluid must be brought to the earth's surface, if the chemistry and physical properties of the fluid are to be determined by laboratory analysis.

In the rotary drilling of wells, such tests are made by inserting into the well a string of test tools which, in essence, includes a pipe extending from the earth's surface into the formation of interest, a packer for isolating the well bore adjacent to the formation of interest from the rest of the well bore, and openings in the pipe communicating the bore of the pipe with the isolated zone in the well bore. The pipe contains the required test instruments and valves for controlling flow of formation fluid through the pipe. When a sample of the formation fluid is to be collected, the pipe may also contain means for taking the sample. The present invention is concerned with such last mentioned means.

A principal object of the invention is to provide improved apparatus for taking a sample of formation fluid as it flows through a string of well pipe.

Another object of the invention is to provide a fluid sampler adapted to form a section of a string of well pipe and including provision for circulating drilling mud through the well pipe without disturbing the sample of fluid in the sampler.

Another object is to provide a fluid sampler capable of capturing a sample of fluid substantially exactly representative of the fluid in the formation of interest.

Another object is to provide a fluid sampler having a closure device on which fluid pressure forces act in substantial balance, so that no resultant force is applied to the closure device that would tend to open it.

In brief, the invention, in one of its aspects, resides in apparatus for taking a sample of fluid from a string of well pipe which includes an elongated, tubular housing adapted to form a section of a string of well pipe; a pair of longitudinally spaced partitions in the housing providing a sample collection chamber therebetween, each of the partitions having a port therein, the ports being in longitudinal alignment with each other; a rod extending longitudinally through the ports and reciprocable therein; a pair of spaced valve members carried by the rod, the valve members being adapted to close the ports when the rod is in one position and to open the ports when the rod is longitudinally displaced to another position; means for attaching the rod to a rod reciprocating means; the rod having a fluid passageway extending longitudinally therethrough, the passageway having terminal openings at each end, the terminal openings located outside of the outer ends of the valve members; and means for normally closing the passageway, the last mentioned means being removable to allow fluid to flow through the passageway.

In another of its aspects, the invention resides in apparatus for taking a sample of fluid from a string of well pipe including an elongated tubular housing adapted to form a section of a string of well pipe; a pair of longitudinally spaced partitions in the housing providing a sample collection chamber therebetween, each of the partitions having a port therein, the ports being in longitudinal alignment with each other; a rod extending longitudinally through the ports and reciprocable therein; a pair of spaced valve members carried by the rod, the valve members being adapted to close the ports when the rod is in one position and to open the ports when the rod is longitudinally displaced to another position; means for attaching the rod to a rod reciprocating means; and a sleeve mounted on the rod, the valve members being mounted on the sleeve, the sleeve being spaced from the rod to provide a fluid passage between the sleeve and the rod, the fluid passage having terminal openings outside of the outer ends of the valve members.

In the drawings:

FIG. 1, consisting of FIGS. 1a and 1b, is a vertical sectional view through a portion of the earth showing a well having therein a string of well pipe including an exemplary form of fluid sampling apparatus in accordance with the invention;

FIG. 2, consisting of FIGS. 2a, 2b, and 2c, is an axial sectional view, on an enlarged scale, of a portion of the string of well pipe shown in FIG. 1, which portion includes the foregoing fluid sampling apparatus;

FIG 5 is a view similar to FIG. 4, with certain of the parts in still other alternative positions in which the sample chamber is fully closed;

FIG. 6 is a view, on the enlarged scale of FIG. 3, of the sample container of the invention removed from the pipe string and secured for shipment;

FIG. 7 is a transverse sectional view taken along the line 7—7 of FIG. 6 looking in the direction of the arrows; and FIG. 8 is an enlarged vertical sectional view of a portion of the pipe string shown in FIG. 2c.

Figure 2A:
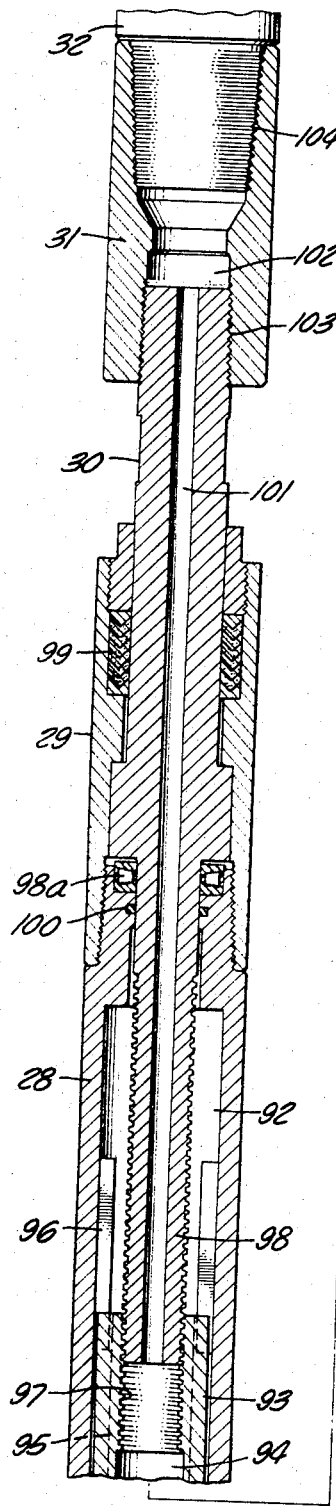

Referring to the drawings, particularly to FIGS. 1a and 1b, there is shown a portion 10 of the earth's crust having a well 11 drilled downwardly therein from the earth's surface 12. The bottom of the well bore is shown at 13. Inserted in the well, and extending from above the earth's surface to the bottom of the well, is a string of well pipe, generally designated 14, particularly a drill stem test string. The pipe string traverses a stratum of interest 15, being an earth formation which may contain hydrocarbons, such as oil and gas, and may also contain water. It is desired to test this stratum, by obtaining a representative sample of fluid from the stratum, bringing this sample unchanged to the surface of the earth, and subjecting the sample to laboratory examination.

The test string includes the illustrative fluid sampling apparatus of the invention and a number of other pipe sections and subs. Considered from the bottom end of the test string, the components include a tail pipe 16, a lower, open-hole packer 17 below the formation of interest, a perforated pipe section 18 opposite the formation of interest, and an upper, open-hole packer 19 above the formation of interest. In the string above the upper packer is a hydraulic main valve 20. Above this is the sampler of the invention, including a rod guide sub 21, a bottom housing sub 22, and a main housing sub 23. The sampler may be connected to the main hydraulic valve 20 by intermediate pipe sections 24, 25 and 26.

Connected to the top of the sampler is a shut-in tool that has a sleeve housing sub 27, a center housing 28, a housing 29, a mandrel 30, and a head 31.

At the top of shut-in tool is a drill pipe section 32, which may include drill collars and drill pipe joints, that extend out of the top of the well.

The foregoing components, except the sampler and shut-in tool, need not be described in detail hereinafter, as they are well known in the art of drill stem testing. Although the shut-in tool is known, it will be described with greater particularity hereinafter, as it cooperates closely with the sampler. Of course, the sampler will be described in detail.

In brief, the foregoing well pipe string isolates the portion of the well that traverses the formation of interest from the rest of well bore, and allows this zone to be placed in controlled communication with the atmosphere at the earth's surface through the perforated pipe section and the pipe sections thereabove. The packers 17 and 19 isolate the zone of interest from the rest of the annulus between the well bore and the pipe string. These packers are seated and released by manipulations of the pipe string, as is conventional. The main hydraulic valve is also conventionally operated by pipe-string manipulation to open and close a valve commanding flow of fluid through the pipe string. Operation of the shut-in tool and sampler will be described hereinafter.

Figure 2B:
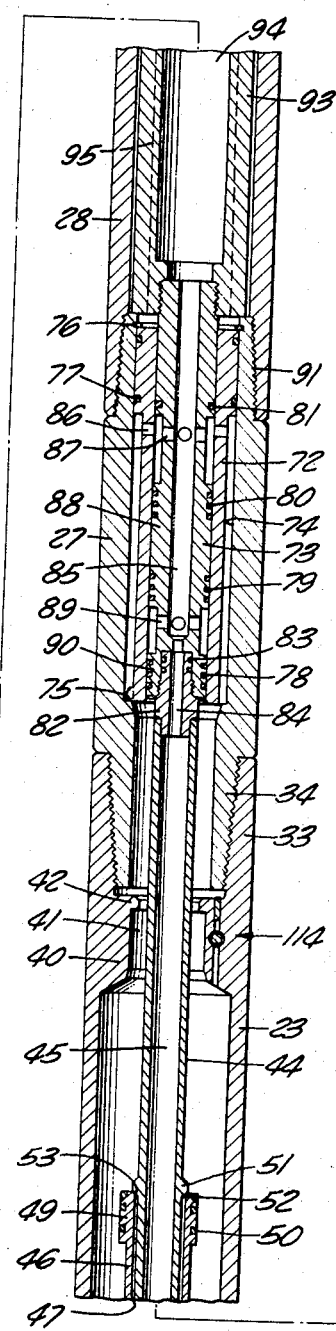
Figure 2C:
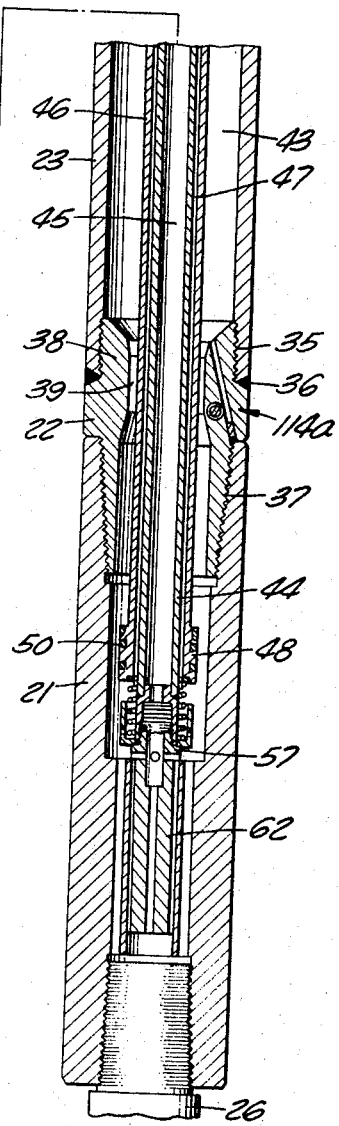

Referring to FIG. 2, the section of the test string shown extends from the top of the conecting pipe section 26 to the bottom of the drill pipe section 32.

The main housing sub 23 of the sampler has a threaded box conection 33 at the top, by which it is releasably conected to the threaded pin 34 at the bottom of the sleeve housing sub 27. The bottom of the main housing sub is conected to the bottom housing sub 22 by a threaded joint 35, the joint being welded at 36 to provide a hermetic seal between the bottom housing sub and the main housing sub. A pin-and-box threaded joint 37 connects the sub 22 to the rod guide sub 21.

The sample container 22, 23 has an internal lower partition 38 formed as a part of the sub 22, the partition having an axial cylindrical port 39 provided therein. An internal upper partition 40 having a cylindrical port 41 formed therein is located near the top of the sample container. The upper and lower ports are in axial alignment with each other and preferably are of the same internal diameter. The upper port has an inturned flange 42 of slightly reduced diameter with respect to the port. The upper and lower partitions provide therebetween a chamber 43 for reception of a sample of formation fluid.

A valve rod 44 extends axially through the sample chamber and the upper and lower ports. The valve rod has a longitudinal bore 45 therein. A valve sleeve 46 is fitted loosely on the valve rod for sliding movement. There is an annular space 47 between the rod and the sleeve which provides a fluid flow passage, the purpose of which will be set forth hereinafter.

At the bottom of the valve sleeve, a lower cylindrical plug valve 48 is provided, the valve 48 being adapted to seat in the lower port 39 to close the latter. A similar upper plug valve 49 is provided at the top of the valve sleeve and is adapted to close the upper port upon movement thereto. When the upper valve is fully seated in its port, it abuts the flange 42 to thereby limit upward movement of the assembly of the valve sleeve and the plug valves. (See FIG. 5.) The plug valves 48 and 49 are fitted with O-rings 50 to assure that the valves seat tightly in the ports.

Referring to FIG. 2b, the valve rod 44 is formed with an annular ring 51 located immediately above the upper valve 49, shown in abutment with the ring. The ring has a bottom inclined valve surface 52 that seats on the complementary seat 53 on the upper plug valve. The ring 51 also acts as a stop member to limit upward movement of the plug valve and valve sleeve assembly on the valve rod 44.

As best seen in FIG. 8, a nipple 54 is welded to the bottom of the valve rod 44. A bore 55 is provided in the nipple and the bore is threaded at 56 to threadedly receive a member 57 having a portion 58 of enlarged diameter upon which is supported a cup 59. A spring 60 is compressed between the inside bottom of the cup and the bottom of the lower plug valve 48. The side of the cup has perforations 61 therethrough.

The member 57 has a terminal portion 62 having longitudinal surface grooves 63 extending throughout its length. The terminal portion is slidably received in a guide sleeve 64 carried by longitudinal fins 65 formed in the rod guide sub 21, the fins providing longitudinal fluid flow passages therebetween.

The bore 55 is extended axially entirely through the member 57 and has a lower section 66 connecting with the bottom of an intermediate plug well 67 of larger diameter, the top of the well connecting with a blow-out plug bore 68 having a diameter intermediate the diameters of the well and the lower bore section 66. A blow-out plug 69, having an O-ring, is tightly seated in the blow-out plug bore and retained in the bore by a shearable O-ring 70 received in opposed grooves in the blow-out plug and in the bore 68.

Radial passages 71 place the plug well 67 in fluid communication with the exterior of the guide member 57, the outer ends of the passages 71 being aligned with the surface grooves 63 on the guide member. When the plug 69 is forced out of its bore 68 by pressure of fluid in the bore of the valve rod 44, the plug is displaced to the bottom of the well, as shown in dotted lines in FIG. 8, thereby placing the bore 45 in the valve rod in fluid communication with the exterior of the guide member 57.

Referring to FIG. 2, the sleeve housing sub 27 of the shut-in tool is threaded to the main housing sub 23 of the fluid sampler. The sleeve housing sub 27 has a valve sleeve 72 fixedly mounted in the housing. Within the valve sleeve is a longitudinally slidable valve slide 73 that performs two important functions. First, the valve slide, in cooperation with the valve sleeve, controls flow of fluid through the test string 14. Second, the valve slide, being attached to the valve rod 44 of the fluid sampler, moves the valve assembly of the fluid sampler to close the ports 39 and 41 to trap a sample of fluid in the chamber 43 of the sampler.

A bore 74 is provided in the sleeve housing sub 27, the valve sleeve 72 being held in this bore against a shoulder 75 by a snap ring 76. The sleeve is sealed in the bore by O-rings 77. O-rings 78, 79, 80 and 81 seal the valve slide in the sleeve. A tubular fitting 82 connects the slide to the valve rod 44, the fitting being welded to the valve rod 44, and threaded to the slide 73. Other O-rings 83 seal the fitting to the slide. The fitting has an axial bore 84 that communicates the bore 45 of the valve rod 44 with a bore 85 extending longitudinally through the slide. It will be seen that the slide 73 and the valve rod 44 can move longitudinally as a unit, whereby the plug valves 48 and 49 of the sampler are actuated.

The valve sleeve 72 has ports 86 that, as seen in FIG. 2b, are in alignment with upper ports 87 in the valve slide, whereby fluid is permitted to flow from outside the sleeve into the bore 85 in the slide, and thence up through the test string. The slide also has a cylindrical portion 88 that blocks the sleeve ports 86 when the slide is moved up. (See FIG. 3.) Further, the slide has lower ports 89 that can be brought into registry with the ports 86 in the sleeve when the slide is moved up still farther. Additionally, the slide has a lower cylindrical portion 90 that can block the bore of the sleeve at a location above the sleeve ports 86 when the slide is moved up in the sleeve to its highest position (see FIG. 5), thereby blocking fluid flow between the sleeve housing sub 27 and the center housing 28 thereabove.

Means for longitudinally translating the slide 73 are carried by the subs 28, 29 and 31. The center housing 28 is joined to the sleeve housing sub 27 by a pin-and-box connection 91, the center housing having an internal cylindrical chamber 92. Slidable in the chamber is a crosshead 93, to the bottom of which the valve slide 73 is threadedly attached for translation by the crosshead. Within the crosshead is a fluid passage 94 that is in fluid communication with the central bore 85 of the slide 73. The crosshead has longitudinal grooves 95 into which project splines 96 that are fixed to the housing 28. Thus, the crosshead may move longitudinally in the housing, but is prevented from rotation in the housing by the splines and grooves.

The crosshead 93 has a threaded bore 97 into which is threaded the lower end 98 of the mandrel 30. The mandrel is rotatable with respect to the housing 28 but cannot move longitudinally with respect to it. Rotation of the mandrel will therefore raise or lower the crosshead, depending on the direction of rotation. The mandrel 30 is mounted for rotation on a thrust bearing 98a received in a bearing recess at the upper end of the center housing 28. The housing 29, which is screwed to the center housing 28, provides radial and thrust bearing support for the mandrel. A packing 99 seals the mandrel in the housing 28. An O-ring 100, just below the bearing 98a, seals the bearing from the chamber 92 in the center housing.

A longitudinal fluid passage 101 through the mandrel connects at the bottom with the fluid passage 94 in the crosshead, and at the top with a bore 102 in the head 31, the latter being threaded to the top of the mandrel at 103. The drill pipe section 32 is jointed to the head 31 by a pin-and-box connection 104, and is in fluid communication with the bore 102 of the head 31.

In operation, the test string is made up and inserted in the well bore, as shown in FIG. 1. The hydraulic main valve 20 is closed, and the packers 17 and 19 are set. With the parts of the shut-in tool and sampler disposed as shown in FIG. 2, fluid pressure in the test string below the hydraulic main valve and in the annulus around the perforated pipe 18 is permitted to equalize with the fluid pressure in the formation of interest 15. The hydraulic main valve is then opened and formation fluid is permitted to flow up the test string to a level above the hydraulic main valve, as driven by the formation pressure and as allowed by the flow characteristics of the formation. Fluid enters the rod guide sub 21 and flows through this sub mainly around the terminal portion 62 of the guide member 57, around the lower plug valve 48, through the lower port 39 of the sampler, outside of the valve sleeve 46, and into the chamber 43 of the sampler. From this chamber, fluid flows upward through the upper port 41 of the sampler outside of the valve rod 44. The flow of fluid through the sleeve housing sub 27 takes place through the annulus between the bore 74 and the valve sleeve 72, inward through the ports 86 in the sleeve and the ports 87 in the valve slide 73, and up through the bore 85 of the valve slide into the fluid passage 94 of the crosshead 93. From the latter passage, the fluid passes up through the fluid passage 101 of the mandrel 30 and thence, through the bore 102 of the head 31, and into and up the drill pipe section 32, which is open to the atmosphere at the top.

When the top of the column of fluid has reached a level higher than the sleeve housing sub 27, the well is closed in below the sleeve housing sub by closing the valve in this sub while leaving open the upper and lower ports 41 and 39 of the sampler. This is accomplished by rotating the drill pipe section 32, using conventional means at the surface of the earth, while the housing 28 and the subs therebelow are held against rotation by their engagement with the well bore and with the bottom of the well. The drill pipe section is rotated in a direction to cause the cross head 93 to be drawn up by the mandrel screw 98 to the position shown in FIG. 3, whereby to place the cylindrical portion 88 of the valve slide 73 in register with the ports 86 of the valve sleeve 72, and thus to block upward flow of well fluid beyond the ports 86. With the valve slide 73 in the position shown in FIG. 3, the sampler valve assembly, with its plug valves 48 and 49, will be in a position somewhat above that shown in FIG. 2, but not high enough to seat the plug valves in their respective sampler ports; thus the sampler ports 41 and 39 will be open.

Figure 4:
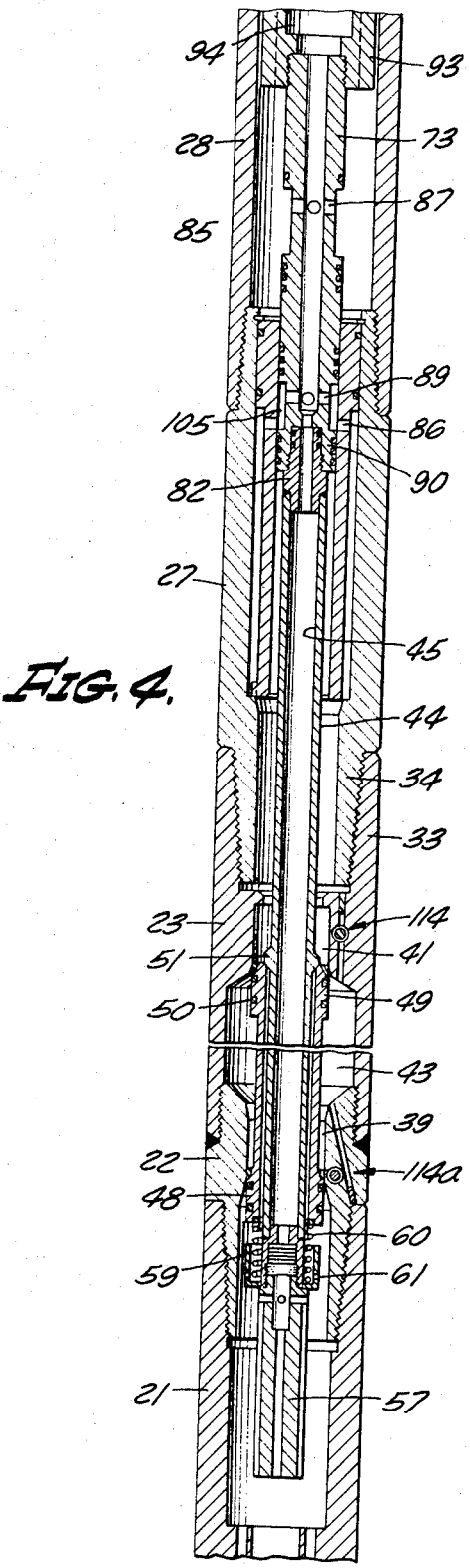
FIG. 4 is an axial sectional view of a portion of the pipe string shown in FIG. 2, and on the same scale as FIG. 2, with certain of the parts in alternative positions in which the sample chember is beginning to close.
Figure 3:
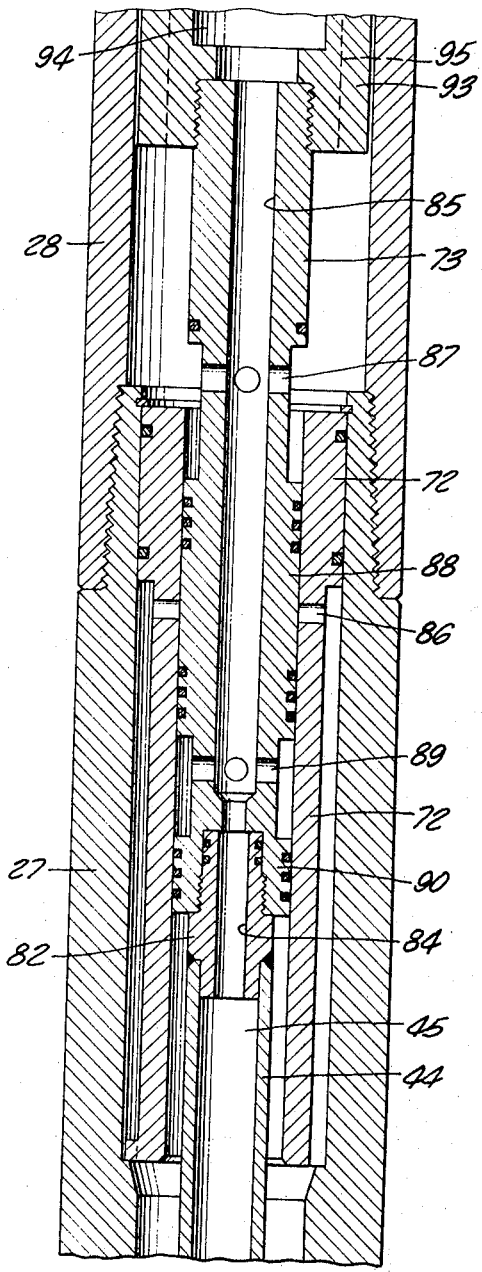
FIG. 3 is an axial sectional view, on a still further enlarged scale, of a portion of the pipe string shown in FIG. 2b.

When the well has been thus shut in for a time sufficient to allow formation pressures and pressures in the test string below the shut-in tool to reach a steady state, the well is caused to flow again. This is accomplished by further rotation of the mandrel screw 98 to raise the crosshead 93 and the valve slide 73 from their positions as shown in FIG. 3, to positions slightly below those shown in FIG. 4. As seen in FIG. 4, the lower slide ports 89 are in communication with the sleeve ports 86 through an annular groove 105 formed in the periphery of the slide. With the bottom of this annular groove opposite the sleeve ports 86, the valve is open, but it will be seen that the plug valves 48 and 49 of the sampler valve assembly are just within the ports 39 and 41 cutting off fluid flow through these ports. However, if the valve slide 73 is lowered from the FIG. 4 position to a position in which the top of the annular groove 105 is opposite the sleeve ports 86, the valve plugs 48 and 49 will be lowered sufficiently to permit fluid to flow through the sampler ports 39 and 41, while the valve 86, 105, 89 stays open.

With the parts of the apparatus in the latter position, the well is permitted to flow until balanced flow conditions are achieved.

Because a fluid sample taken from this steadily flowing stream of well fluids is the most nearly representative sample of the formation fluids that can be obtained, it is desired to trap such a sample in the apparatus of the invention and substantially simultaneously shut off flow through the test string. These results are realized by raising the crosshead 93, the valve slide 73, and the sampler valve assembly from their final flow positions through their positions as shown in FIG. 4 to their finally closed positions as shown in FIG. 5. By rotating the mandrel 30, as described hereinbefore, the foregoing members are lifted into the positions shown in FIG. 5. When the apparatus is finally closed, the lower cylindrical portion 90 of the valve slide 73 closes the bore in the valve sleeve 72 at a location above the sleeve ports 86, and fluid flow is blocked at this location. Also, the plug valves 48 and 49 are in positions fully closing the ports 39 and 41 in the partitions of the sample container, and the desired fluid sample is trapped in the container.

It will be seen in FIG. 5 that the cup 59 has been pulled up into contact with the bottom of the lower plug valve 48 against the urgence of the spring 60 to force the top of the upper plug valve 49 into abutment with the flange 42, thereby positively holding the plug valve and sleeve assembly in closed position. It will also be seen that the valve rod 44 has moved up to displace the annular ring 51 from engagement with the top of the upper plug valve 49. Fluid communication is thus established, through the annular space 47 and the perforations 61 in the sides of the cup, between the bore of the test string below the lower plug valve 48 and the bore of the test string above the upper plug valve 49. Thus the fluid pressure acting on the top of the upper plug valve 49 is equalized with the fluid pressure acting on the bottom of the lower plug valve 48. As the plug valves are of the same diameter, the fluid pressure forces acting on the outer ends of the plug valves are equal and opposite, and there is no resultant force tending to move the plug valve assembly in either direction in the sampler housing. Similarly, there is no resultant force from the fluid within the sampler chamber 43 that tends to move the plug valve assembly out of closed position, because the uniform fluid pressure in the sample chamber acts of equal areas of the plug valves.

It will be appreciated from a consideration of FIG. 4 that the plug valves of the sampler and the slide valve close in a predetermined sequence. As shown in FIG. 4, the lower plug valve 48 has entered the lower port 39 a greater distance than the upper plug valve 49 has entered the upper port 41, and that the valve slide 73 has not yet closed the port 86. The elements close in the order: lower plug valve 48 first, upper plug valve 49 second, and sleeve port 86 third. This order of closing is preferred, as it substantially prevents surges of pressure from acting on the sample in the sample chamber 43 as the sample is trapped, and thus assures that the sample is not changed by such pressure surges and, therefore, is representative of the formation fluid flowing up the test string at the time of final shut-in of the well.

After the sample has been taken, the test string is brought out of the well with the sample securely locked in the chamber 43 of the sample container 22, 23. The sample container is broken out of the test string, in a manner to be more fully explained hereinafter, and shipped to the laboratory for analysis of the sample.

Should it become necessary, after the sample is trapped, and while the test string is in the well to circulate fluid down the pipe and up through the annulus between the pipe and the well bore, as might be the case if the pipe were to become stuck in the well, such circulation can be carried out without releasing the sample from the sample chamber. After opening the hydraulic main valve 20, fluid, such as drilling mud, is pumped into and down the pipe string from suitable equipment at the earth's surface. Downward flow of this mud is blocked by the lower cylindrical portion 90 of the valve slide 73 (see FIG. 5). However, the mud can flow into the bore 45 of the valve rod 44 through the ports 87 and 89 of the valve slide, through the axial bore 85 in the valve slide, and through the bore 84 in the tubular fitting 82. The pressure of mud in the bore of the valve rod is increased to a value sufficient to blow the blow-out plug 69 from the plug bore 68, as described hereinbefore with particular reference to FIG. 8. When the blow-out plug has been displaced, mud can flow down through the test string from the bore 44 in the valve rod into the hydraulic main valve 20, through the main valve, through the perforations into the annulus surrounding the test string, and thence back to the earth's surface by way of the annulus.

In this procedure, the circulating mud flows through the valve rod, bypassing the sample chamber 43 containing the sample. The sample housing may be retrieved, as described hereinbefore, without loss of the sample. FIGS. 6 and 7 show the sample container removed from the test string and prepared for shipment to the laboratory. The sample container, including the subs 22 and 23, has the plug valve assembly, including the lower plug valve 48, the valve sleeve 46, and the upper plug valve 49, positioned to close the upper and lower ports to retain the fluid sample in the chamber 43. The upper end of the valve assembly abuts the flange 42 and the cup 59 engages the bottom of the valve assembly. A retainer cap 106, threaded to the pin 37a, has an axial sleeve 107 welded to it at 108. The upper end of the sleeve supports the bottom of the cup 59, holding the cup against the bottom of the valve assembly to retain the latter in its closed position. The axial sleeve 107 is internally threaded at 109, and a plug 110 having a hand ring 111 is screwed into the threaded portion of the sleeve. An upper threaded plug 112 having a hand grip 113 is threadedly received in the box connection 33.

Bleed-off means, generally designated 114, are provided for discharging fluid sample from the sample chamber 43. Such means includes a fluid passage 115 communicating the sample chamber 43 with a valve bore 116. A valve seat 117 is provided at the inner end of the bore, and a discharge passage 118, which is temporarily closed by a removable pipe plug 119, conducts fluid from the valve bore 116 to the exterior of the sample container when the plug 119 has been removed. The bleed-off means has a valve member 120 threaded into the bore and sealed therein by an O-ring 121. As shown in FIG. 7, the valve is closed, with the inner tapered end of the valve member 120 seated on the valve seat 117. The valve member has a nick 122 engageable by a screw driver for turning the valve member to open and to close the bleed-off means. Operation of the bleed-off means, for withdrawing the sample from the chamber 43 is obvious from the foregoing description.

The foregoing bleed-off means 114 is used for withdrawing a portion of the gas fraction of the sample which accumulates at the top of the chamber 43. A similar bleed-off means 114a is provided for bleeding-off a portion of the liquid fraction of the sample from the bottom of the sample chamber.

The removal of the sample container from the test string without losing the sample, and the preparation of the container for shipment, will now be described with particular reference to FIGS. 5 and 6. After coming out of the well, the sampler and shut-in tool (see FIG. 1a) are broken out of the test string as a unit. The sample is in the chamber 43, with the parts of the apparatus disposed as shown in FIG. 5. The rod guide sub 21 is removed from the bottom housing sub 22 by breaking the pin-and-box joint 37. The retainer cap 106, with the plug 110 removed, is threaded into the pin 37a. The sleeve 107 has an internal diameter slightly larger than the outside diameter of the guide member 57 which allows the sleeve to slide easily over the guide member. Guide member 57 is next unscrewed from the nipple 54 (see FIG. 8), withdrawn through the bottom of the sleeve 107, and put aside. The retainer cap 106 and its sleeve 107 hold the plug valve assembly in place. The plug 110 with its hand ring is then screwed into the sleeve 107. Next, the pin-and-box joint 34, 33 is broken out, whereupon the sample container 23, 22 with the retainer cap 106 in place, is removed by sliding it down over the valve rod 44 and nipple 54. Finally, the upper threaded plug 112 is threaded into the box 33 to complete the container assembly shown in FIG. 6.

From the foregoing description it is seen that the apparatus of the invention fulfills the objects of the invention.

It will be understood that various modifications may be made in the exemplary apparatus shown and described herein without departing from the invention. It will also be apparent that the apparatus of the invention may be used in a drill stem test string conjointly with any desired test equipment, such as pressure recorders, temperature recorders, and the like.

I claim:

1. Apparatus for taking a sample of fluid from a string of well pipe comprising:
   (a) an elongated, tubular housing adapted to form a section of a string of well pipe;
   (b) a pair of longitudinally spaced partitions in said housing providing a sample collection chamber therebetween, each of said partitions having a port therein, said ports being in longitudinal alignment with each other;
(c) a rod extending longitudinally through said ports
(d) a pair of spaced valve members carried by said rod, said valve members being adapted to close said ports when said rod is in one position and to open said ports when said rod is longitudinally displaced to another position;
(e) means for attaching said rod to a rod reciprocating means;
(f) said rod having a fluid passageway extending longitudinally therethrough, said passageway having terminal openings at each end, said terminal openings located outside of the outer ends of said valve members; and
(g) means for normally closing said passageway, said last mentioned means being removable to allow fluid to flow through said passageway.

2. Apparatus for taking a sample fluid from a string of well pipe comprising:
(a) an elongated, tubular housing adapted to form a section of a string of well pipe;
(b) a pair of longitudinally spaced partitions in said housing providing a sample collection chamber therebetween, each of said partitions having a port therein, said ports being in longitudinal alignment with each other;
(c) a rod extending longitudinally through said ports and reciprocable therein;
(d) a pair of spaced valve members carried by said rod, said valve members being adapted to close said ports when said rod is in one position and to open said ports when said rod is longitudinally displaced to another position;
(e) means for attaching said rod to a rod reciprocating means;
(f) said rod having a fluid passageway extending longitudinally therethrough, said passageway having terminal openings at each end, said terminal openings located outside of the outer ends of said valve members; and
(g) means for normally closing said passageway but responsive to a preselected difference in fluid pressure across said last mentioned means for opening said passageway.

3. Apparatus for taking a sample of fluid from a string of well pipe comprising:
(a) an elongated, tubular housing adapted to form a section of a string of well pipe;
(b) a pair of longitudinally spaced partitions in said housing providing a sample collection chamber therebetween, each of said partitions having a port therein, said ports being in longitudinal alignment with each other;
(c) a rod extending longitudinally through said ports and reciprocable therein;
(d) a pair of spaced valve members carried by said rod, said valve members being adapted to close said ports when said rod is in one position and to open said ports when said rod is longitudinally displaced to another position;
(e) means for attaching said rod to a rod reciprocating means; and
(f) a sleeve mounted on said rod, said valve members being mounted on said sleeve, said sleeve being spaced from said rod to provide a fluid passage between said sleeve and said rod, said fluid passage having terminal openings outside of the outer ends of said valve members.

4. Apparatus as defined in claim 3 wherein said sleeve is longitudinally slidable on said rod, and cooperating stop members on said rod and said sleeve limiting relative longitudinal movement of said rod and said sleeve in both directions.

5. Apparatus as defined in claim 4 including resilient means acting between said rod and said sleeve to resist relative longitudinal movement of said rod and said sleeve in one direction.

6. Apparatus as defined in claim 5 wherein said cooperating stop members that limit relative longitudinal movement of said rod and said sleeve in one direction comprise cooperating valve members adapted to close upon relative movement of said rod and said sleeve into a limited position in one direction of movement, and to open upon relative movement of said rod and said sleeve in the opposite direction of movement.

References Cited
UNITED STATES PATENTS

| | | | |
|---|---|---|---|
| 3,266,323 | 8/1966 | Buchanan | 73—425.4 |
| 3,358,755 | 12/1967 | Chisholm | 166—3 |
| 2,388,548 | 11/1945 | Jurs | 73—425.4 |
| 2,854,082 | 9/1958 | Ansile | 166—3 |
| 2,862,561 | 12/1958 | Teubner | 73—425.4 X |
| 3,308,882 | 3/1967 | Le Bourg | 166—3 |

S. CLEMENT SWISHER, *Primary Examiner.*

U.S. Cl. X.R.

166—150, 226

PO-1050
(5/69)

UNITED STATES PATENT OFFICE
CERTIFICATE OF CORRECTION

Patent No. 3,437,138          Dated April 8, 1969

Inventor(s) Lyle B. Scott

It is certified that error appears in the above-identified patent and that said Letters Patent are hereby corrected as shown below:

Column 2, line 51, "chember" should be --chamber--. Column 3, line 46, "conecting" should be --connecting--; line 49, "conection" should be --connection--; lines 50 and 52, "conected" should be --connected--. Column 7, line 16, "of" (first occurrence) should be --on--. Column 9, line 3, after "ports" insert --and reciprocable therein;--; line 19, after "sample" insert --of--. Column 10, line 28, "5" should be --4--.

SIGNED AND
SEALED

OCT 21 1969

(SEAL)
Attest:

Edward M. Fletcher, Jr.
Attesting Officer

WILLIAM E. SCHUYLER, JR.
Commissioner of Patents